United States Patent
Gaddi et al.

(10) Patent No.: US 9,373,447 B2
(45) Date of Patent: Jun. 21, 2016

(54) ROUTING OF MEMS VARIABLE CAPACITORS FOR RF APPLICATIONS

(75) Inventors: Roberto Gaddi, S-Hertogenbosch (NL); Robertus Petrus Van Kampen, S-Hertogenbosch (NL); Richard L. Knipe, McKinney, TX (US); Anartz Unamuno, Roermond (NL)

(73) Assignee: CAVENDISH KINETICS, INC., San Jose, CA (US)

( * ) Notice: Subject to any disclaimer, the term of this patent is extended or adjusted under 35 U.S.C. 154(b) by 130 days.

(21) Appl. No.: 14/239,115

(22) PCT Filed: Aug. 17, 2012

(86) PCT No.: PCT/US2012/051427
§ 371 (c)(1),
(2), (4) Date: Apr. 15, 2014

(87) PCT Pub. No.: WO2013/028546
PCT Pub. Date: Feb. 28, 2013

(65) Prior Publication Data
US 2014/0218839 A1   Aug. 7, 2014

Related U.S. Application Data

(60) Provisional application No. 61/525,224, filed on Aug. 19, 2011, provisional application No. 61/530,534, filed on Sep. 2, 2011.

(51) Int. Cl.
*H01G 5/16*   (2006.01)
*H01G 5/38*   (2006.01)
(Continued)

(52) U.S. Cl.
CPC . *H01G 5/16* (2013.01); *H01G 5/38* (2013.01); *H01G 7/00* (2013.01); *H01H 59/0009* (2013.01); *Y10T 29/43* (2015.01)

(58) Field of Classification Search
CPC ............ H01G 5/16; H01G 5/011; H01G 7/00

USPC ................. 361/277, 278, 281, 283.1, 287, 361/290–292
See application file for complete search history.

(56) References Cited

U.S. PATENT DOCUMENTS

| 7,545,622 B2* | 6/2009 | Morris, III | H03H 7/463 361/281 |
| 7,936,553 B2* | 5/2011 | Oakes | H01G 2/00 361/273 |

(Continued)

FOREIGN PATENT DOCUMENTS

| JP | 2008278147 A | 11/2008 |
| JP | 2010245276 A | 10/2010 |

(Continued)

OTHER PUBLICATIONS

Chinese Office Action (with attached English translation) for Application No. 201280040288.4 dated Feb. 3, 2016; 30 total pages.

(Continued)

*Primary Examiner* — Nguyen T Ha
(74) *Attorney, Agent, or Firm* — Patterson & Sheridan, LLP

(57) ABSTRACT

Utilizing a variable capacitor for RF and microwave applications provides for multiple levels of intra-cavity routing that advantageously reduce capacitive coupling. The variable capacitor includes a bond pad that has a plurality of cells electrically coupled thereto. Each of the plurality of cells has a plurality of MEMS devices therein. The MEMS devices share a common RF electrode, one or more ground electrodes and one or more control electrodes. The RF electrode, ground electrodes and control electrodes are all arranged parallel to each other within the cells. The RF electrode is electrically connected to the one or more bond pads using a different level of electrical routing metal.

29 Claims, 8 Drawing Sheets

(51) Int. Cl.
*H01H 59/00* (2006.01)
*H01G 7/00* (2006.01)

(56) References Cited

U.S. PATENT DOCUMENTS

| | | | | |
|---|---|---|---|---|
| 8,385,045 | B2* | 2/2013 | Habu | H01G 7/06 |
| | | | | 361/277 |
| 8,503,157 | B2* | 8/2013 | Ikehashi | H01G 5/16 |
| | | | | 361/277 |
| 8,890,543 | B2* | 11/2014 | Steeneken | H01G 5/16 |
| | | | | 257/532 |
| 8,988,849 | B2* | 3/2015 | Testino | H01G 7/04 |
| | | | | 361/277 |
| 2008/0232023 | A1 | 9/2008 | Oakes et al. | |
| 2008/0266029 | A1 | 10/2008 | Mi et al. | |
| 2009/0185325 | A1 | 7/2009 | Park et al. | |
| 2010/0116632 | A1 | 5/2010 | Smith et al. | |
| 2011/0063773 | A1 | 3/2011 | Ikehashi | |
| 2011/0273246 | A1 | 11/2011 | Mi et al. | |

FOREIGN PATENT DOCUMENTS

| | | |
|---|---|---|
| JP | 2011101227 A | 5/2011 |
| JP | 2011244233 A | 12/2011 |

OTHER PUBLICATIONS

Japanese Office Action (with attached English translation) dated Apr. 5, 2916, for Japanese Patent Application No. 2014-526254.

* cited by examiner

ROUTING OF MEMS VARIABLE CAPACITORS FOR RF APPLICATIONS

BACKGROUND OF THE INVENTION

1. Field of the Invention

Embodiments of the present invention generally relate to a variable capacitor for radio frequency (RF) and microwave applications.

2. Description of the Related Art

As the size of semiconductors continues to shrink, so does the micro-electromechanical systems (MEMS) that are coupled to the semiconductors. MEMS devices may be used in miniature relay switches, capacitive switches, non-volatile memory elements and for many more applications. The MEMS devices have a suspended structure that moves between at least two positions to modify the electrical impedance to the flow of continuous or alternate current MEMS devices are made using similar processing steps to those found in semiconductor foundries and therefore can be manufactured cost effectively on a wafer scale. Some of the issues that arise in MEMS devices include unwanted capacitive coupling, series inductance and losses. To minimize unwanted capacitive coupling, high quality substrates, such as sapphire or quartz, have been considered with heterogeneous integration of semiconductor processes thereover. Another technique to minimize unwanted capacitive coupling is to increase the size of the intrinsic MEMS device, e.g., the variable capacitor, in order to minimize the relative impact of stray capacitance on the device performance (i.e., the capacitance tuning ratio).

Large cross section interconnects have been used to attempt to minimize series inductance and losses and therefore to maximize the quality factor. High conductivity metallizations has also been attempted to maximize the quality factor. Additionally, minimizing losses due to packaging by adopting chip level assembly integration strategies and the use of high quality low loss substrate materials such as sapphire and quartz have been attempted in order to maximize the quality factor.

To date, the efforts to minimize capacitive coupling, minimize series resistance and inductance, and therefore maximize the quality factor have not been as successful as desired. Therefore, there is a need in the art for a MEMS variable capacitor that minimizes unwanted capacitive coupling, minimizes series inductance and maximizes the quality factor.

SUMMARY OF THE INVENTION

The present invention generally relates to a variable capacitor for RF and microwave applications. The variable capacitor includes a bond pad that has a plurality of cells electrically coupled thereto using CMOS back-end metallization routing. Each of the plurality of cells has a plurality of MEMS devices therein. The MEMS devices share a common RF electrode, one or more ground electrodes and one or more control electrodes. The RF electrode, ground electrodes and control electrodes are implemented using a second level of routing completely enclosed within the cell (Intra Cavity Routing or ICR). The RF electrode, ground electrodes and control electrodes are all arranged parallel to each other within the cells.

In one embodiment, a variable capacitor includes a substrate, a bond pad disposed over the substrate and a plurality of cells disposed over the substrate and coupled to the bond pad. Each cell has a first end and a second end and comprises: an RF electrode coupled to the bond pad and the first end of each cell, a plurality of MEMS devices disposed over the RF electrode, each MEMS device having a first end and a second end and one or more ground electrodes coupled to the first end and the second end of each MEMS device and to the second end of the cell.

In another embodiment, a variable capacitor includes a substrate, a bond pad disposed over the substrate and a plurality of cells disposed over the substrate and coupled to the bond pad. Each cell has a first end and a second end and comprises: an RF electrode coupled to the bond pad and the first end of each cell, a plurality of MEMS devices disposed over the RF electrode, each MEMS device having a first end and a second end, one or more ground electrodes that are each coupled to the first end and the second end of each MEMS device and to the second end of the cell and two control electrodes that are each disposed between the RF electrode and a corresponding ground electrode.

In another embodiment, a method of manufacturing a variable capacitor comprises fabricating a plurality of cells above a substrate having a bond pad thereon, each cell having an RF electrode and a plurality of MEMS devices disposed therein that extend from respective first ends to respective second ends in a direction substantially perpendicular to the RF electrode, electrically connecting each RF electrode to the bond pad and sealing each cell to form a sealed cavity.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present invention generally relates to a variable capacitor for RF and microwave applications. The variable capacitor includes a bond pad that has a plurality of cells electrically coupled thereto using CMOS back-end metallization routing. Each of the plurality of cells has a plurality of MEMS devices therein. The MEMS devices share a common RF electrode, one or more ground electrodes and one or more control electrodes. The RF electrode, ground electrodes and control electrodes are implemented using a second level of routing completely enclosed within the cell ICR. The RF electrode, ground electrodes and control electrodes are all arranged parallel to each other within the cells.

Figure 1A:
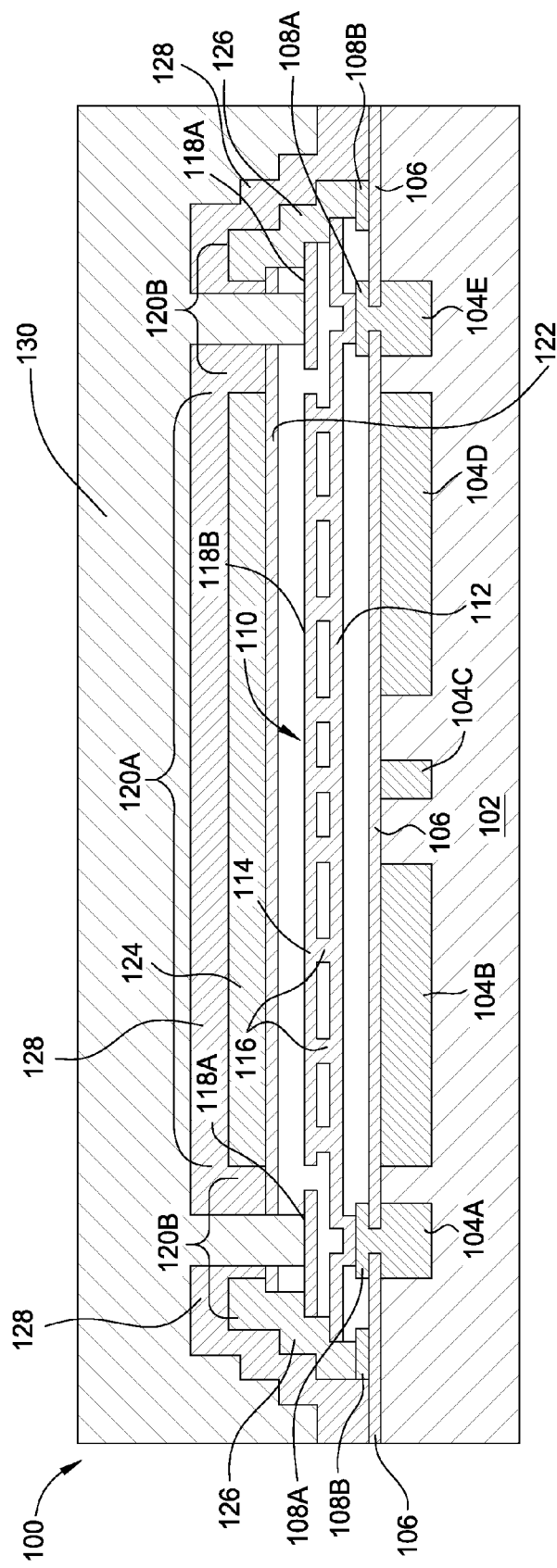
FIG. 1A is a schematic cross-sectional view of a MEMS device according to one embodiment.
Figure 1B:
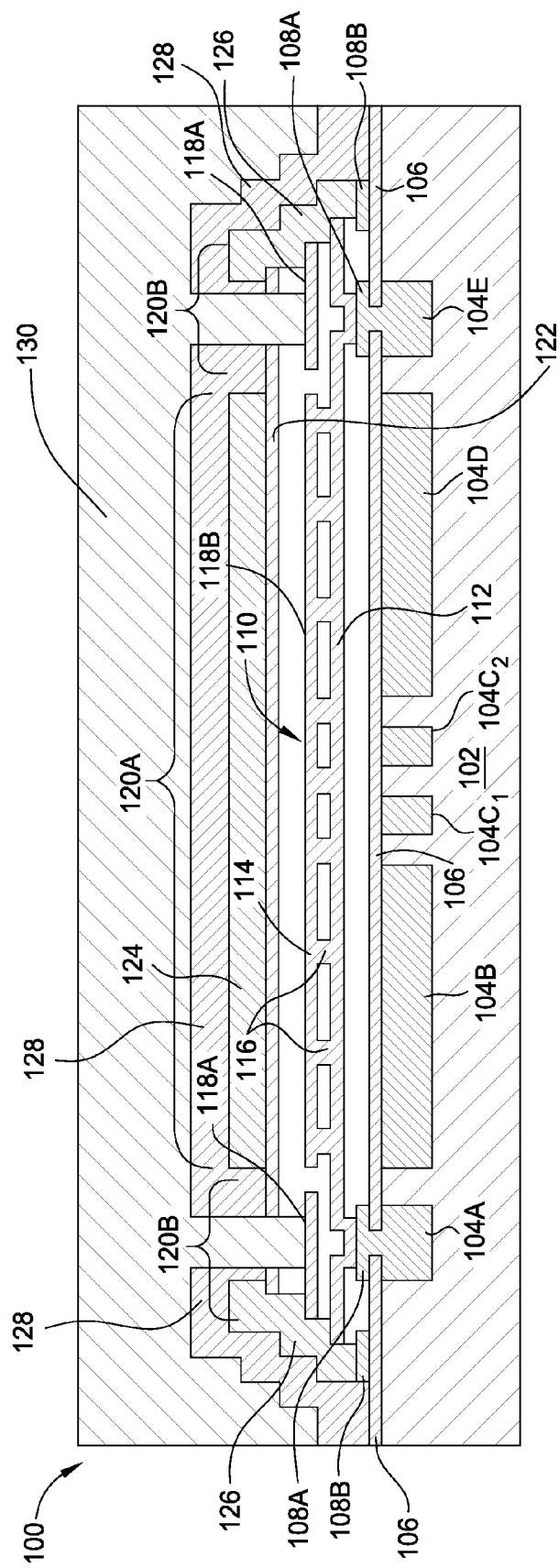
FIG. 1B is a schematic cross-sectional view of a MEMS device according to another embodiment.

FIG. 1A is a schematic cross-sectional view of a MEMS device 100 according to one embodiment. The MEMS device 100 is fabricated by forming grounding electrodes 104A, 104E, control electrodes 104B, 104D and an RF electrode 104C. FIG. 1B is a schematic cross-sectional view of a MEMS device according to another embodiment whereby two RF electrodes $104C_1$, $104C_2$ are present. It is to be understood that while two grounding electrodes 104A, 104E and two control electrodes 104B, 104D have been shown, it is contemplated that a single grounding electrode and a single control electrode may be utilized. The substrate 102 may comprise a single layer material such as a semiconductor based substrate for a stand-alone MEMS device or generically a multilayer structure such as is produced in a back end of the line (BEOL) process. In one embodiment, the substrate 102 may comprise a complementary metal oxide semiconductor (CMOS) substrate. Suitable materials that may be used for the electrodes 104A-104E include electrically conductive materials commonly utilized in BEOL processes such as copper, aluminum, titanium, tantalum, tungsten, titanium nitride, aluminum nitride, tungsten nitride and combinations thereof. The electrodes 104A-104E may be formed by well known deposition methods such as physical vapor deposition (PVD), chemical vapor deposition (CVD), electroplating and atomic layer deposition (ALD) and well known patterning methods such as etching or well known dual damascene processing steps. The control electrodes 104B, 104D, will function as pull-in electrodes to move the switching element into a position adjacent the RF electrode 104C.

Over the electrodes 104A-104E, a thin dielectric layer 106 is deposited and then patterned to expose the ground electrodes 104A, 104E. Suitable materials that may be utilized for the thin dielectric layer 106 include silicon nitride, silicon carbide, silicon oxide, alumina, silicon oxynitride, and other dielectric materials suitable for use in a CMOS device. The dielectric layer 106 may be deposited by well known deposition methods including CVD and ALD. The thin dielectric layer 106 is useful for several reasons including: reducing sticking of the switching element to the electrodes 104B-104D and reducing recombination of etching gas ions when removing sacrificial material that will be discussed below.

Over the thin dielectric layer 106, electrically conductive material may be blanket deposited and then patterned to form the electrical interconnects 108A to the ground electrodes 104A, 104E. Additionally, the electrically conductive material may be patterned to form pads 108B that may be utilized as a seed material for deposition of anchoring material to be deposited at a later time. Suitable materials for the electrical interconnects 108A and pads 108B include electrically conductive materials commonly utilized in BEOL processes such as copper, aluminum, titanium, tantalum, tungsten, titanium nitride, tungsten nitride, aluminum nitride and combinations thereof. The electrically conductive material may be deposited by well known deposition methods such as PVD, CVD, electroplating and ALD and then patterned by well known patterning methods such as etching.

A sacrificial material is then deposited over the exposed dielectric layer 106 as well as the electrical interconnects 108A and pads 108B. It is contemplated that an adhesion promoter may be deposited over the dielectric layer 106 prior to deposition of the sacrificial material to help adhere the sacrificial material thereto. Suitable materials for the sacrificial material include spin-on glass or spin on dielectric containing long chain molecules with a carbon backbone. The sacrificial material may be deposited by well known deposition methods such as spin coating, CVD and ALD. The sacrificial material is termed a sacrificial material because the material is used to at least partially define the cavity and will be removed at a later time in the production process. Thus, the sacrificial material is used and 'sacrificed' or removed to form a cavity.

After deposition of the sacrificial material, the switching element 110 may then be formed. The switching element 110 may comprise a multilayer structure including a first structural layer 112. The first structural layer 112 is coupled to the electrical interconnects 108A and spans the length between the electrical interconnects 108A. A second structural layer 114 is then disposed over the first structural layer 112 and coupled to the first structural layer 112 by a plurality of posts 116. Suitable materials that may be used for the first structural layer 112, second structural layer 114 and posts 116 include titanium nitride, titanium aluminum, tungsten, copper, titanium aluminum nitride, aluminum and combinations thereof and multilayer structures such as titanium nitride/titanium aluminum nitride/titanium nitride. The first switching element 110 may be formed by depositing the material using well known deposition methods such as PVD, CVD, and ALD and then patterning the material by well known patterning methods such as etching. The second structural layer 114 is patterned to have a first portion 118A that is axially aligned with the ground electrodes 104A, 104E and a second portion 118B that will be part of the flexible portion 120 of the switching element 110. As completed, the switching element 110 has a waffle-like appearance.

Additional sacrificial material may be deposited over the switching element 110 and in between formation of the first structural layer 112 and the second structural layer 114. The additional sacrificial material, together with the first deposited sacrificial material, defines the shape and boundary of the cavity within which the switching element 110 will move. Over the last deposited sacrificial material, a second dielectric layer 122 may then be deposited. The second dielectric layer 122 may be deposited using well known deposition methods and materials as discussed above with regards to dielectric layer 106.

The second dielectric layer 122 is then patterned and etched to define the outline of the cavity. In the same step, the sacrificial layers are etched whereby the structural layers 118A, 112 serve as a hardmask to provide a gradual step-down of the cavity sidewalls. This multi-step step-down improves the integrity of the cavity walls 126.

An electrically conductive material is then deposited and patterned to form the pull-off electrode 124 as well as the cavity walls 126. Thus, during the same deposition, the material used to form both the pull-off electrode 124 as well as the cavity walls 126 is deposited. During the patterning, the pull-off electrode 124 and the cavity walls 126 become separate elements. It is to be understood that while the pull-off electrode 124 is shown to be above the switching element 110, the pull-off electrode 124 may be electrically connected to a material that is disposed below the switching element 110. Additionally, the cavity walls 126 are grounded through the ground electrodes 104A, 104E. Suitable materials for the electrically conductive material include electrically conductive materials commonly utilized in BEOL processes such as copper, aluminum, titanium, tantalum, tungsten, titanium nitride, and combinations thereof. The electrically conductive material may be deposited by well known deposition methods such as PVD, CVD, and ALD and the patterned by well known patterning methods such as etching.

After the electrically conductive material is patterned, a dielectric roof 128 may be deposited over the electrically conductive material. The dielectric roof 128 provides electrical isolation between the pull-off electrode 122 and the walls 126 that comprise the electrically conductive material. The dielectric roof 128 encapsulates the MEMS device 100. The dielectric roof 128 may be deposited using well known deposition methods and materials as discussed above with regards to dielectric layer 106. It is contemplated that the electrically conductive material that is used to form the cavity walls 126 may be eliminated from the cavity walls 126 such that the dielectric roof 128 is deposited in sufficient quantity to form the cavity walls 126.

One or more release holes may then be formed through the dielectric roof 128, and the second dielectric layer 122. An etching gas is then introduced to remove the sacrificial material and free the switching element to move within the cavity. Suitable etching gases that may be used include $H_2$, $NH_3$, $O_2$, $O_3$, $N_2O$ or any other etching gas that produces H, O, or N. The cavity is then sealed by depositing a sealing layer 130 over the dielectric roof 128 and within the release holes.

In operation, the switching element 110 is moved by applying an electrical bias to either the pull-in electrodes 104B, 104D or to the pull-off electrode 124. The flexible portion 120A (118B) of the switching element 110 moves while the anchor portion 120B (118A) is fixedly attached to the ground electrodes 104A, 104E. The sealing layer 130 and the electrically conductive walls 126 both provide additional leverage to ensure the anchor portion 120B does not detach from the ground electrodes 104A, 104E. As shown in FIG. 1A, both ends of the switching element 110 have anchoring portions 120B and both anchoring portions 120B are directly coupled to both the sealing layer 130 as well as the electrically conductive material that was deposited to form the pull-off electrode 124.

The MEMS device 100 described above is an embodiment of a MEMS device that is utilized in a MEMS variable capacitor device for RF and microwave applications, where minimizing parasitic and losses is of primary concern. The MEMS device 100 may be used in a MEMS based variable capacitor that is integrated in a sealed cavity embedded within a CMOS back-end.

There are several advantages to utilizing the MEMS device 100 in a variable capacitor. One advantage is the trade-off between minimizing the losses (i.e., best Q factor) and minimizing unwanted capacitive coupling (i.e., best capacitance tuning ratio) is superior to alternative traditional device architectures. The second level of routing implemented by the ICR provides reduced capacitive coupling thanks to the following: (1) the ICR metallization thickness can be optimized to provide an optimum trade-off between low parasitic capacitance and low losses inside the cell, while the first level of routing connecting all cells to the pad, which carries the largest currents, can be implemented in thicker metal without significantly adding to the parasitic capacitance; (2) the ICR is enclosed within a cell in such a way that effective shielding is provided against capacitive coupling to other monolithically integrated circuits nearby on the same substrate; and (3) the ICR can be integrated above the standard CMOS back end metallization, providing a larger distance to the active substrate or underlying ground planes implemented in the lowest CMOS metal layers. Another advantage is that the fabrication of a sealed cavity is facilitated due to the narrow and long shape of the cavity (discussed below), which helps both release and structural strength. Additionally, hierarchical grouping allows the definition of control groups (i.e., devices which share the same control electrode) tailored to the resolution requirements of the digital variable capacitor (i.e., minimum step size in the variation of capacitance vs. control). There is, however, a slight impact on integration complexity and cost in that the routing will be performed by two different metallization layers in place of a single layer found in traditional routing schemes.

Figure 2:
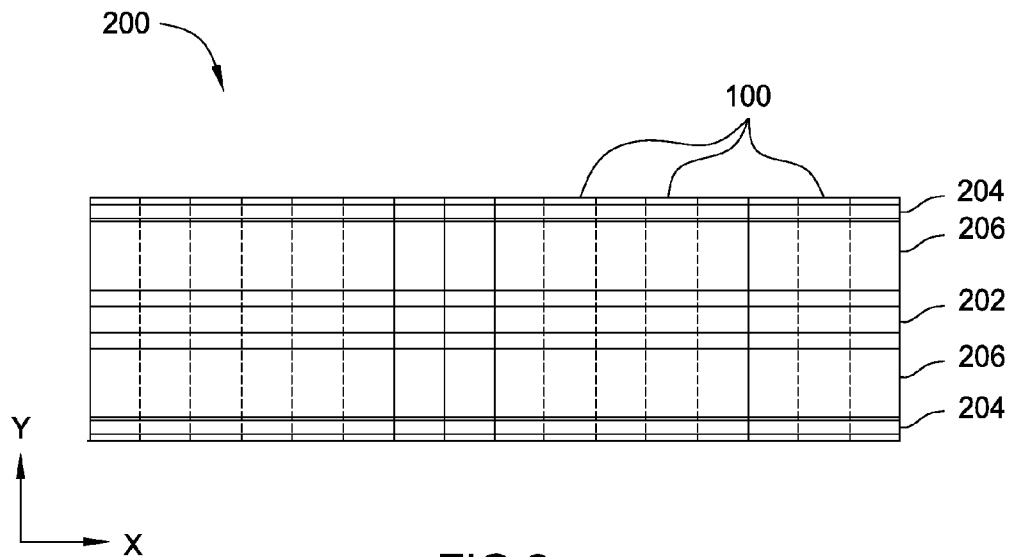
FIG. 2 is a schematic illustration of a cell 200.

The arrangement of MEMS variable capacitor devices is done by generating a first grouping hierarchy named a cell. FIG. 2 is a schematic illustration of a shunted cell 200. The cell 200 will comprise a plurality of MEMS devices 100 that are collectively within a common cavity. The MEMS devices 100 will share an RF electrode 202 as well as one or more control electrodes 206 and one or more ground electrodes 204. Each of the electrodes 202, 204, 206 will be arranged within the cell parallel to each other. The MEMS devices 100 will be arranged such that the second portion 118B (See FIGS. 1A and 1B) of the MEMS devices 100 extends from the ground electrodes 204 in a direction perpendicular to the RF electrode 202, control electrodes 206 and ground electrodes 204.

The second level of RF routing is generated within any given cell, such routing being named intra-cavity routing (ICR). All MEMS devices 100 (generically shown by the dashed lines) which are part of one cell 200 have the following characteristics. All MEMS devices in one cell 200 share the same sealed cavity. A single RF conductor is shared among all MEMS devices 100 in the cell 200, such a conductor being named the ICR RF electrode 202. In situations where the MEMS device 100 utilizes two RF electrodes 202 (such as a variable capacitor in series configuration), each one of such electrodes will be implemented with one single conductor within any given cell 200. A single RF-ground conductor is shared among all MEMS devices 100 in the cell 200, such a conductor being named the ICR ground electrode 204. It is to be understood that a separate ground electrode 204 is contemplated for each side of the MEMS devices 100. A single control conductor is shared among all MEMS devices 100 in the cell 100, such a conductor being named the ICR control electrode 206. In situations where the MEMS device 100 utilizes two or more control electrodes 206, each one of such control electrodes 206 will be implemented with one single conductor within any given cell 200. FIG. 2 shows an example layout view of ICR for a variable capacitor in shunt configuration, showing the three electrodes: RF electrode 202, ground electrode 204 and control electrode 206.

The MEMS devices 100 within the cell 200 are aligned along one dimension in order to occupy an oblong area with one dimension (i.e., the "X" dimension) significantly larger than the other (i.e., the "Y" dimension). The MEMS devices 100 are arranged such that the second portion 118B of the MEMS devices 100 extends over the RF electrode 202 in a direction perpendicular to the RF electrode 202. Within this arrangement the cell cavity is long and narrow which improves the manufacturability and reliability under environmental stress conditions.

The RF electrode 202 is shaped as a straight path of given width, with the length given by the total number of MEMS devices 100 to be included in the cell 200. The same applies to the ICR ground electrode 204 and to all ICR control electrodes 206. The location of RF, ground and control electrodes 202, 204, 206 within the cell 200 will depend on the variable capacitor design configuration (e.g., series vs. shunt) and on the electromechanical design topology of the MEMS device elements.

In any case, the inductance per unit length of the ICR RF electrode inside a cell will be combined with the unit capacitance implemented by each MEMS device 100 to generate a distributed LC network. Losses in the form of both series resistance and parallel conductance will also contribute to the total electrical response of the cell 200 as an equivalent distributed RLGC network. The optimization of inductance per unit length and unit capacitance per MEMS device 100 allows minimizing the equivalent parasitics of such distributed network, depending on the targets specification set in terms of frequency range of operation. The optimization buys a level of flexibility to the design process which would not be available with traditional routing schemes. This is a key advantage of the second level of routing approach in the overall struggle of minimizing parasitics for high frequency operation. FIG. 2 is an example implementation of ICR in the case of a shunt configured variable capacitor.

Figure 3:
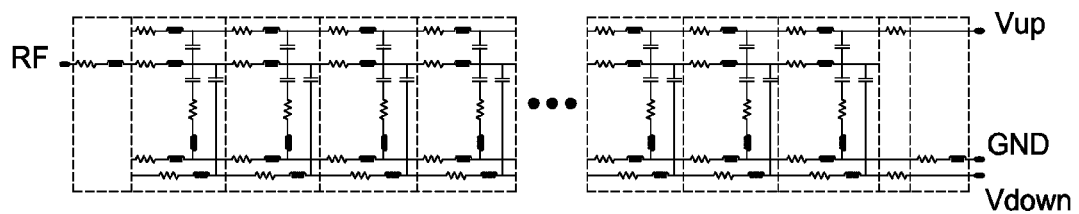
FIG. 3 is a simplified schematic of the equivalent RLGC circuit of a cell with intra-cavity routing (ICR).

The electrical connection of the cell element to the back-end metal routing is done by via connections at either ends of the cell ICR. FIG. 3 is a simplified schematic of the equivalent RLGC circuit of a cell with ICR, including the ports representing connections of the cell to the back-end routing at either ends; in this case the existence of two control electrodes and a single RF electrode corresponds to a shunt configured variable capacitor with latching MEMS device design. For the embodiments described herein, latching is understood to mean a device that is always actively biased in either a pull-in or pull-off state while never operating in an unbiased, free-standing state. In the schematic shown in FIG. 3, the distributed network describing an example cell implementation with ICR is shown, including the end connections for RF, ground and control electrodes. RF and ground electrodes should have connections at opposite sides of the cell, allowing for minimum parasitics.

The grouping of a given number of cells to implement a variable capacitor of desired size also follows a topology concept aimed at minimizing further parasitics. The BEOL RF routing is deployed around a center pad, which provides connection to the application circuit. Long and narrow cells' aspect ratio allows arranging multiple cells quasi-circular around this center pad, following what will hereafter be named a "hoof" shape. This minimizes the total effective electrical length of all traces summed together and leads to the lowest possible equivalent series RL and shunt parasitic capacitance. The shape of the RF routing is such that the best trade-off is achieved between further unwanted stray capacitance coupling and resistive/inductive series losses. The RF routing is shaped as a hoof and the cells are connected to its outside edges. The equivalent series inductance and resistance are minimized when looking at the response of all cells referenced to the pad connecting point, while at the same time using the least amount of routing metal area, which directly links to the stray capacitive coupling. This novel connection approach also minimizes the number of used RF pads for a given required capacitor size. This is achieved by optimal usage of the available chip area around RF and GND pads, for a given pitch dictated by the chip-scale packaging technology of choice. The resulting small number of RF pads can therefore be kept very close to the die edge, avoiding extra parasitics build-up when considering the next level of assembly (either RF board or module) due to long copper traces having to reach locations deeper underneath the die's footprint.

Figure 4:
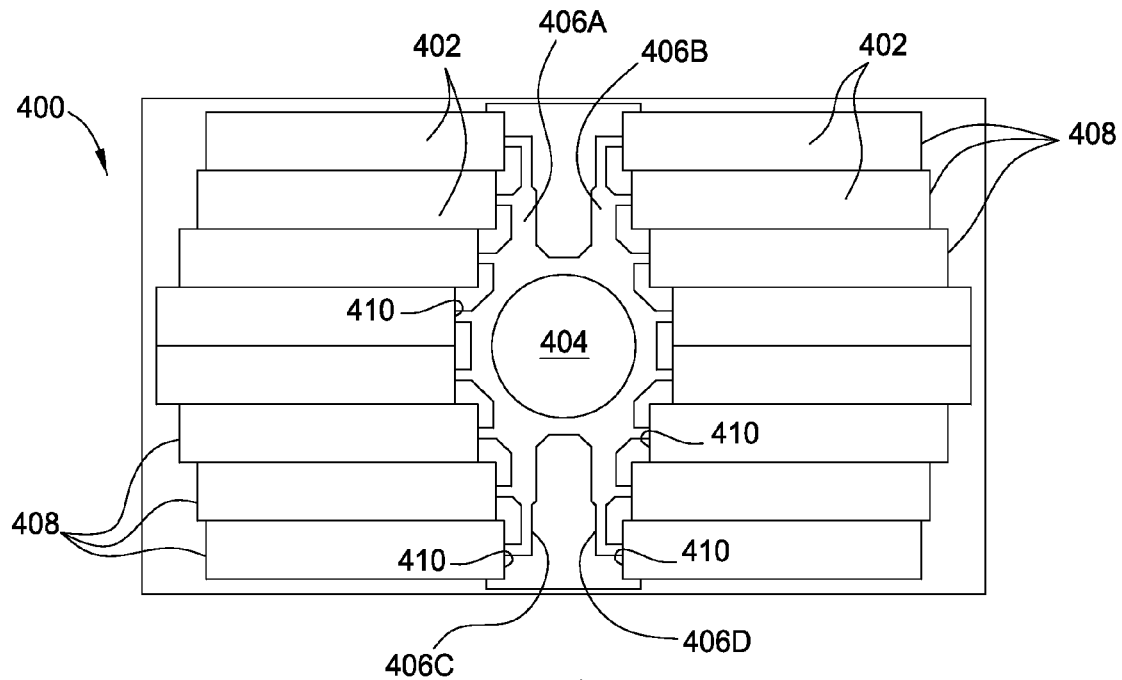
FIG. 4 is a schematic layout of a shunted variable capacitor where a bifurcated routing topology is utilized.

Going more into specific embodiments, further requirements can impact the detailed hoof designs routing. One such requirement is the maximum RF power to be sustained by the device. FIG. 4 is an example implementation of a complete shunt configuration variable capacitor device 400 based on sixteen equal individual cells 402. Each cell 402 will have one or more MEMS devices 100 therein that share a common RF electrode 202. Each cell 402 is implemented with ICR as described above. As shown in FIG. 4, a bifurcated hoof routing topology is adopted to increase maximum power rating. The bifurcated routing involves utilizing a common bond pad 404 and having four branches 406A-406D of electrically conductive material that extend from the bond pad 404. Branches 406A, 406C are mirror images for branches 406B, 406D. Similarly, branches 406A, 406B are mirror images of branches 406C, 406D. Each cell 402 is then individually connected to a corresponding branch 406A-406D on a first end 410 to provide the RF connection to the individual cells 402. The device topology is shunt, and the ground routing is connected at the opposite side 408 of the cells 402.

Figure 5:
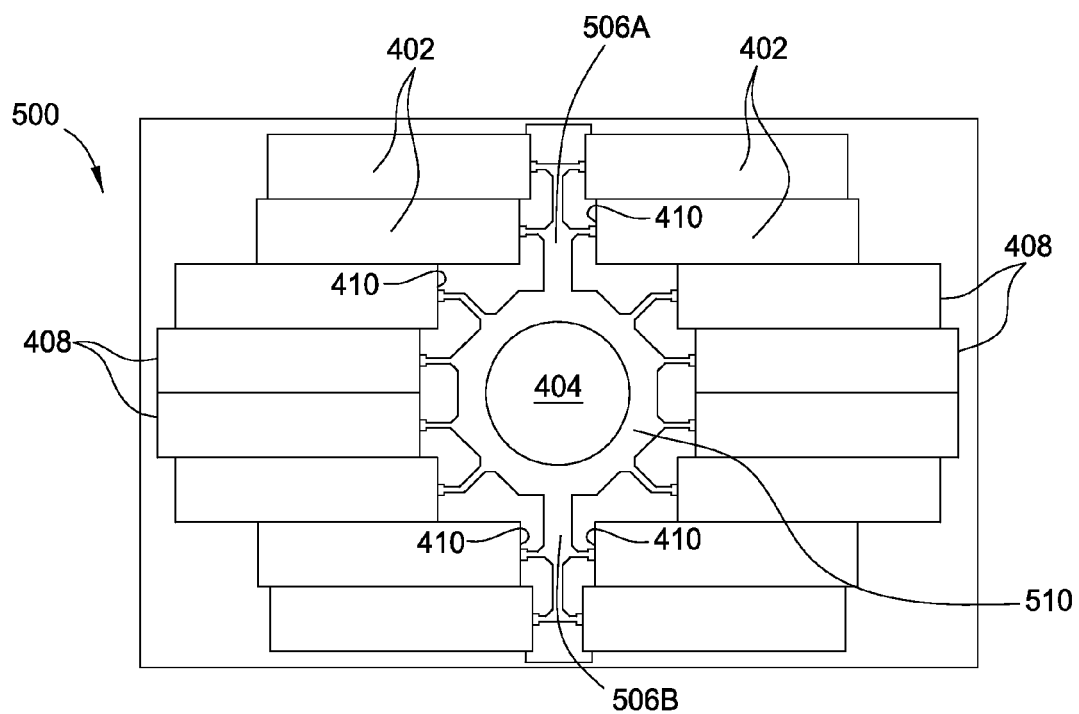
FIG. 5 is a schematic layout of a shunted variable capacitor where single branches stem from the center pad location.

A second alternative implementation is shown in FIG. 5. FIG. 5 shows an example implementation of a complete shunt configuration variable capacitor device 500 based on sixteen equal individual cells 402. Each cell 402 will have one or more MEMS devices 100 therein that share a common RF electrode 202. The capacitor device 500 includes a common bond pad 404 having a single branch hoof routing topology. Branches 506A, 506B extend in opposite direction from the bond pad 404. The branches 506A, 506B comprise electrically conductive material. Branches 506A, 506B are mirror images of each other. Each cell 402 is individually connected to either a corresponding branch 506A, 506B or directly to the trunk 510 that surrounds the bond pad 404 and from which the branches 506A, 506B extend to provide the RF connection to the individual cells 402. The ground connection is made at the opposite side 408 of each cell 402 from the RF connection. Compared to FIG. 4, FIG. 5 reduces further the unwanted stray capacitive coupling at the expenses of slightly decreased RF power rating. The BEOL routing follows the same concept, but the stray capacitive coupling is reduced by having single branches stemming from the center pad location. This minimized metal area comes at the expense of reduced RF power handling compared to the bifurcated design in FIG. 4.

FIGS. 4 and 5 exemplify shunt configurations. Only one RF electrode 202 (See FIG. 2) is present in each cell 402 and is coupled to the bond pad 404 at the first end 410 of the cell 100 while the remaining electrodes are merged to ground. The ground connection is not necessarily coupled to any of the other electrodes of the cells 402. The cells 402 each have one cavity with the electrodes 202, 204 and 206 (See FIG. 2) within each cell 402 independently routed using ICR.

Figure 6:
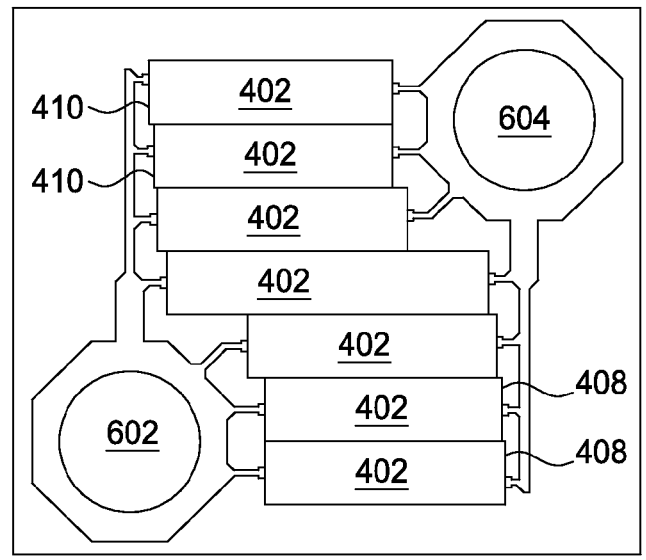
FIG. 6 is a schematic layout of a series variable capacitor according to one embodiment.
Figure 7:
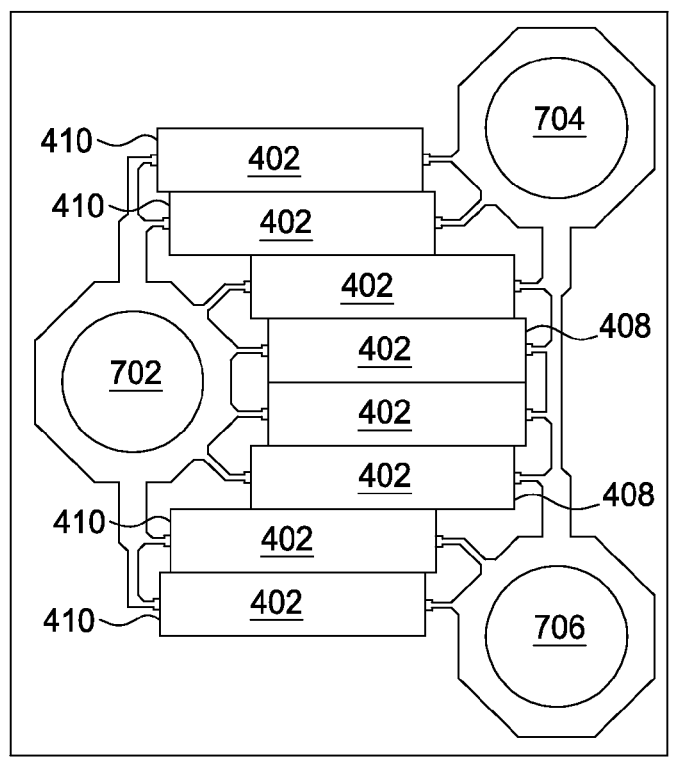
FIG. 7 is a schematic layout of a series variable capacitor according to another embodiment.

A series connection, on the other hand, has two or more RF electrodes $1040_1$, $1040_2$ (See FIG. 1B) that are all coupled to bond pads and one or more ground connections are present. Similar to the shunt configuration, the cells 100 each have one cavity but with the electrodes 104A, 104B, $1040_1$, $1040_2$, 104D, 104E, within the cell 100 routed using ICR (See FIG. 1B). FIGS. 6 and 7 exemplify series implementation of the full capacitor. FIG. 6 utilizes two bond pads 602, 604 while FIG. 7 shows three bond pads 702, 704, 706. For a series component, bond pads 602, 604, 702, 704, 706 are connected to RF electrodes $1040_1$, $1040_2$ are either end 408 or 410 of the cell 402.

The MEMS variable capacitors discussed herein minimize unwanted capacitive coupling, minimize series inductance and maximize the quality factor by achieving the lowest possible series resistance and inductance (RL) given the constraints of the back end CMOS process and solder bumps/chip scale assembly technology applied.

Figure 8:
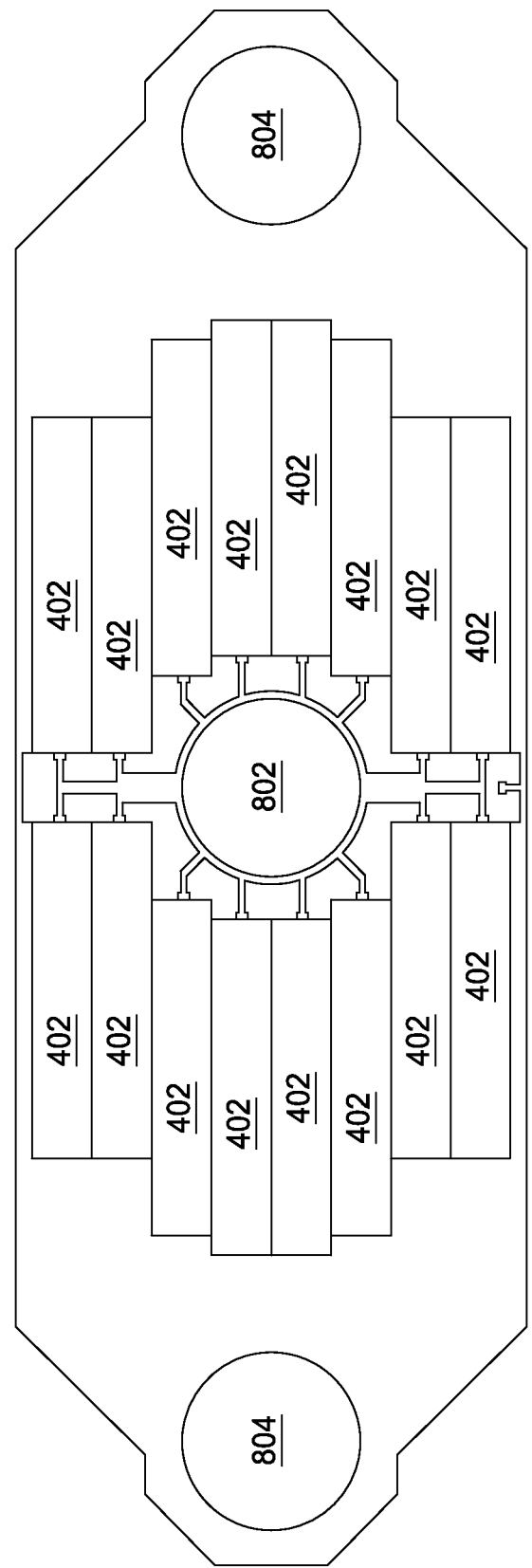
FIG. 8 is a schematic layout of a further optimized capacitor device using a pre-defined pitch between pads.

When the intended application demands for extremely low minimum capacitance, the design of the RF center pad is further optimized to minimize stray parasitic capacitance while maintaining low loss (high Q). FIG. 8 shows such an embodiment where: (1) the center RF pad/bump 802 has been made of minimum area given the solder bump technology of choice; (2) the arrangement of multiple cells 402 in a hoof shape around the center RF pad/bump 802 is such that the equivalent series losses are minimized, hence achieving the best possible Q; (3) the ground bumps 804 at either sides of the capacitor array have been placed at a given fixed pitch dictated by the packaging technology of choice.

Figure 9:
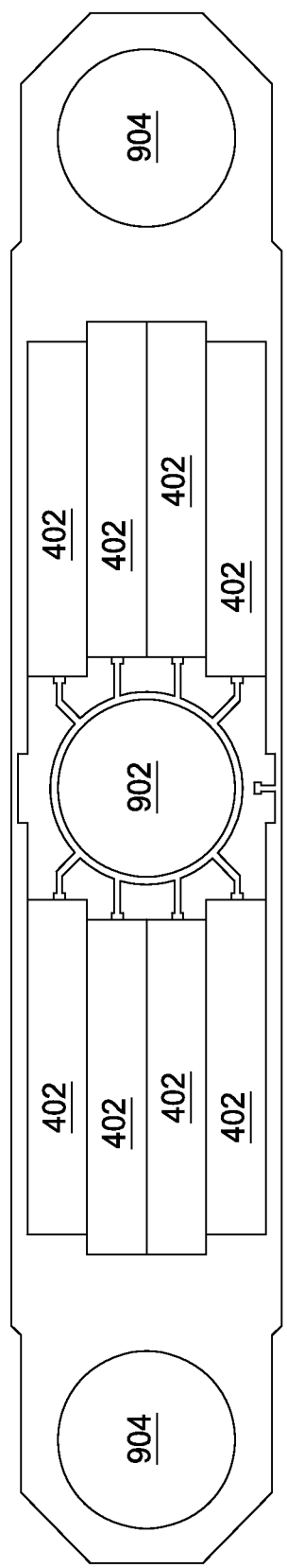
FIG. 9 is a schematic layout of a reduced size capacitor.

The total size of capacitance to be implemented will drive slight variations of the embodiments previously described. FIG. 9 shows a reduced size capacitor. The total number of cells 402 has been reduced and the cells 402 are arranged in 2 semi-circles at both sides of the center RF pad 902. The center RF pad 902 has been made of minimum area given the solder bump technology of choice. The ground bumps 904 at either sides of the capacitor array have been placed at a given fixed pitch, dictated by the packaging technology of choice. Appropriate cells size design, also using slightly different MEMS device size if needed, and control strategy by cells grouping in bits and CMOS design will ensure a uniform step size of the digital capacitor.

Figure 10:
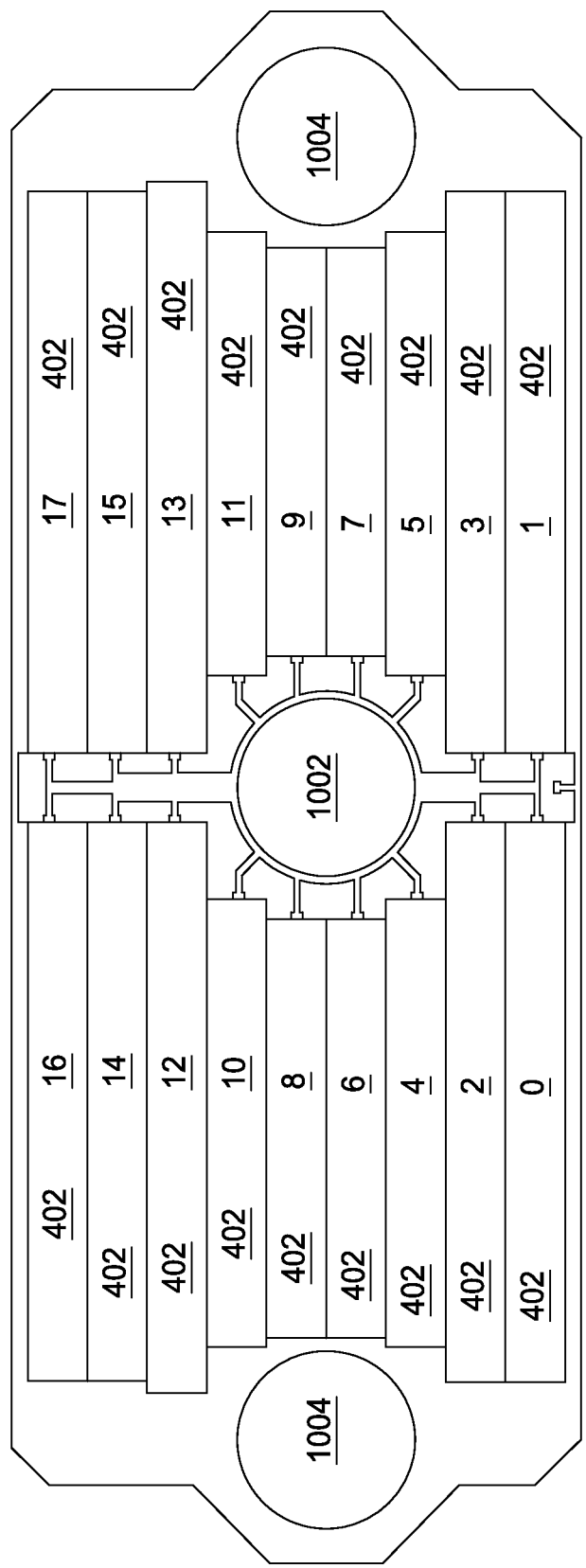
FIG. 10 is a schematic layout of a large size capacitor, constrained by the predefined pitch between pads.

FIG. 10 shows a large size capacitor implementation. The size of cells 402 has been independently designed aiming at achieving the target capacitance value while maintaining a predefined pitch between RF and GND pads 1002, 1004. This is made possible by the ICR design approach that allows independent trade-offs inside and outside the MEMS cells 402. What is achieved is (1) best overall trade-off between series losses and shunt parasitics, maximizing the capacitor's RF performance in terms of Q factor and capacitance range; and (2) maintain a linear capacitance control designing each cell with the right capacitance size and the CMOS controller in such way that binary weighted capacitance sizes are generated. The pitch between connection (bump) pads 1002, 1004 is defined by the packaging technology of choice and cannot be increased. The cell size will then be smaller for the cells that are constrained in-between two bumps 1002, 1004, such as cell numbers 4, 5, 6, 7, 8, 9, 10 and 11. But other cells 402 can extend at both sides of the bump pads 1002, 1004 in order to increase the total capacitance size, such as in cells 0, 1, 2, 3, 12, 13, 14, 15, 16 and 17. Appropriate cell size design, also using slightly different MEMS device size if needed, and control strategy by cell grouping in bits and CMOS design will ensure a uniform step size of the digital capacitor.

While the foregoing is directed to embodiments of the present invention, other and further embodiments of the invention may be devised without departing from the basic scope thereof, and the scope thereof is determined by the claims that follow.

The invention claimed is:

1. A variable capacitor, comprising:
 a substrate;
 one or more bond pads disposed over the substrate; and
 a plurality of cells disposed over the substrate and coupled to the one or more bond pads, each cell having a first end and a second end and comprising:
  one or more RF electrodes coupled to the one or more bond pads and the first end of each cell;
  a plurality of MEMS devices disposed over the one or more RF electrodes, each MEMS device having a first end and a second end; and
  one or more ground electrodes coupled to the first end and the second end of each MEMS device and to the second end of the cell.

2. The variable capacitor of claim 1, wherein the plurality of cells are coupled to the one or more bond pads and have a quasi-circular minimum distance shape.

3. The variable capacitor of claim 1, wherein the plurality of cells are coupled to the one or more bond pads in a bifurcated manner.

4. The variable capacitor of claim 1, wherein the plurality of cells are coupled to the one or more bond pads in a single branch manner.

5. The variable capacitor of claim 1, wherein the one or more RF electrodes and the one or more ground electrodes are parallel to each other and wherein the plurality of MEMS devices each extend from respective first ends to respective second ends in a direction substantially perpendicular to the one or more ground electrodes and the one or more RF electrodes.

6. The variable capacitor of claim 5, further comprising one or more control electrodes disposed within each cell of the plurality of cells, wherein each control electrode extends parallel to the one or more ground electrodes and the one or more RF electrodes.

7. The variable capacitor of claim 1, wherein the variable capacitor is shunted, wherein the one or more RF electrodes comprises a first RF electrode, wherein the one or more bond pads comprises a first bond pad, wherein the first RF electrode is coupled to the first bond pad through the first end of each cell.

8. The variable capacitor of claim 1, wherein the variable capacitor is a series configuration, wherein the one or more RF electrodes comprises a first RF electrode and a second RF electrode, wherein the one or more bond pads comprises a first bond pad and a second bond pad, wherein the first RF electrode is coupled to the first bond pad through the first end of each cell and the second RF electrode is coupled to the second bond pad through the second end of the each cell.

9. The variable capacitor of claim 1, wherein each cell is a sealed cavity that includes the plurality of MEMS devices collectively enclosed within the sealed cavity.

10. The variable capacitor of claim 1, wherein at least one MEMS device of the plurality of MEMS devices comprises a multilayer structure comprising titanium nitride-aluminum-titanium nitride.

11. The variable capacitor of claim 1, wherein each cell further comprises one or more pull-off electrodes disposed in the cell such that the plurality of MEMS devices are disposed between the one or more RF electrodes and the one or more pull-off electrodes.

12. The variable capacitor of claim 1, wherein the substrate comprises a CMOS substrate having a first level of electrical routing and wherein the plurality of cells have a second level of electrical routing that is separate from the first level of routing.

13. A variable capacitor, comprising:
 a substrate;
 one or more bond pads disposed over the substrate; and
 a plurality of cells disposed over the substrate and coupled to the one or more bond pads, each cell having a first end and a second end and comprising:
  one or more RF electrodes coupled to the one or more bond pads and the first end of each cell;
  a plurality of MEMS devices disposed over the one or more RF electrodes, each MEMS device having a first end and a second end;

one or more ground electrodes that are each coupled to the first end and the second end of each MEMS device and to the second end of the cell; and two control electrodes that are each disposed between the one or more RF electrodes and a corresponding ground electrode.

14. The variable capacitor of claim 13, wherein the plurality of cells are coupled to the one or more bond pads and have a quasi-circular minimum distance shape.

15. The variable capacitor of claim 13, wherein the plurality of cells are coupled to the one or more bond pads in a bifurcated manner.

16. The variable capacitor of claim 13, wherein the plurality of cells are coupled to the one or more bond pads in a single branch manner.

17. The variable capacitor of claim 13, wherein the one or more RF electrodes and the one or more ground electrodes are parallel to each other and wherein the plurality of MEMS devices each extend from respective first ends to respective second ends in a direction substantially perpendicular to the one or more ground electrodes and the one or more RF electrodes.

18. The variable capacitor of claim 13, wherein the variable capacitor is shunted, wherein the one or more RF electrodes comprises a first RF electrode, wherein the one or more bond pads comprises a first bond pad, wherein the first RF electrode is coupled to the first bond pad through the first end of each cell.

19. The variable capacitor of claim 13, wherein the variable capacitor is a series configuration, wherein the one or more RF electrodes comprises a first RF electrode and a second RF electrode, wherein the one or more bond pads comprises a first bond pad and a second bond pad, wherein the first RF electrode is coupled to the first bond pad through the first end of each cell and the second RF electrode is coupled to the second bond pad through the second end of the each cell.

20. The variable capacitor of claim 13, wherein each cell is a sealed cavity that includes the plurality of MEMS devices collectively enclosed within the sealed cavity.

21. The variable capacitor of claim 13, wherein at least one MEMS device of the plurality of MEMS devices comprises a multilayer structure comprising titanium nitride-aluminum-titanium nitride.

22. The variable capacitor of claim 13, wherein each cell further comprises one or more pull-off electrodes disposed in the cell such that the plurality of MEMS devices are disposed between the one or more RF electrodes and the one or more pull-off electrodes.

23. The variable capacitor of claim 13, wherein the substrate comprises a CMOS substrate having a first level of electrical routing and wherein the plurality of cells have a second level of electrical routing that is separate from the first level of routing.

24. A method of manufacturing a variable capacitor, comprising:

fabricating a plurality of cells above a substrate having one or more bond pads thereon, each cell having one or more RF electrodes and a plurality of MEMS devices disposed therein that extend from respective first ends to respective second ends in a direction substantially perpendicular to the one or more RF electrodes;

electrically connecting each RF electrode to the one or more bond pads using a different level of routing metal; and sealing each cell to form a sealed cavity.

25. The method of claim 24, wherein the plurality of cells are coupled to the one or more bond pads and have a quasi-circular minimum distance shape.

26. The method of claim 24, wherein the plurality of cells are coupled to the one or more bond pads in a bifurcated manner.

27. The method of claim 24, wherein the plurality of cells are coupled to the one or more bond pads in a single branch manner.

28. The method of claim 24, wherein each cell further comprises one or more ground electrodes that are coupled to each MEMS device with the cell, the method further comprising electrically connecting each ground electrode to ground.

29. The method of claim 24, wherein each RF electrode is connected to the bond pad from an end of the corresponding cell that is opposite to the end of the cell where the one or more ground electrodes are electrically connected to ground.

\* \* \* \* \*